US010605695B2

(12) United States Patent
Chen et al.

(10) Patent No.: US 10,605,695 B2
(45) Date of Patent: *Mar. 31, 2020

(54) INTERROGATING DOE INTEGRITY BY REVERSE ILLUMINATION

(71) Applicant: APPLE INC., Cupertino, CA (US)

(72) Inventors: Denis G. Chen, San Jose, CA (US); Brian S. Medower, San Jose, CA (US); Chin Han Lin, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,882

(22) Filed: Apr. 9, 2018

(65) Prior Publication Data
US 2018/0283984 A1 Oct. 4, 2018

Related U.S. Application Data

(63) Continuation of application No. 15/019,978, filed on Feb. 10, 2016, now Pat. No. 9,970,845.

(51) Int. Cl.
G01J 3/02 (2006.01)
G01M 11/02 (2006.01)
G01J 3/18 (2006.01)
G01J 1/32 (2006.01)
G01J 1/02 (2006.01)

(52) U.S. Cl.
CPC ............ G01M 11/02 (2013.01); G01J 1/32 (2013.01); G01J 3/027 (2013.01); G01J 3/18 (2013.01); G01J 2001/0276 (2013.01); H05K 999/99 (2013.01)

(58) Field of Classification Search
CPC .. G01M 11/02; G01J 1/32; G01J 3/027; G01J 3/18; G01J 2001/0276; H05K 999/99; G01N 21/41; G01N 21/03; G01N 21/8422; G01D 5/38
USPC ................................... 356/124, 237.2–237.6
See application file for complete search history.

(56) References Cited

U.S. PATENT DOCUMENTS 5,104,225 A * 4/1992 Masreliez ............. G01D 5/38
250/237 G
5,579,111 A * 11/1996 Maeda ................. G01D 5/38
250/237 G
6,577,401 B1 * 6/2003 Matsumoto ........... G01D 5/38
356/499

(Continued)

Primary Examiner — Isiaka O Akanbi
(74) Attorney, Agent, or Firm — Kligler & Associates Patent Attorneys Ltd

(57) ABSTRACT

Optical apparatus includes a primary radiation source, which emits first optical radiation along a first optical axis. A DOE includes at least an entrance surface, upon which the first optical radiation from the primary radiation source is incident, and an exit surface, through which one or more primary diffraction orders of the first optical radiation are emitted from the DOE. At least one secondary radiation source is configured to direct second optical radiation to impinge on the DOE along a second optical axis, which is non-parallel to the first optical axis, causing at least a part of the second optical radiation to be diffracted by the DOE such that one or more secondary diffraction orders of the second optical radiation are emitted through the entrance face of the DOE. At least one detector is configured to sense at least one of the secondary diffraction orders of the second optical radiation.

17 Claims, 4 Drawing Sheets

(56) References Cited

U.S. PATENT DOCUMENTS

| | | | | |
|---|---|---|---|---|
| 7,130,048 | B2* | 10/2006 | Takami | G01N 21/211 |
| | | | | 356/369 |
| 8,629,987 | B2* | 1/2014 | Nakanishi | G01D 5/34715 |
| | | | | 250/221 |
| 2001/0006421 | A1* | 7/2001 | Parriaux | G01D 5/38 |
| | | | | 356/499 |
| 2014/0218746 | A1* | 8/2014 | Saendig | G01D 5/266 |
| | | | | 356/487 |

* cited by examiner

INTERROGATING DOE INTEGRITY BY REVERSE ILLUMINATION

FIELD OF THE INVENTION

The present invention relates generally to diffractive optics, and particularly to monitoring the performance of a diffractive optical element (DOE).

BACKGROUND

Diffractive optics are used in a wide variety of applications. In some applications, diffractive optical elements (DOEs) are used in creating a desired projection pattern, for purposes such as optical three-dimensional (3D) mapping, area illumination, and LCD backlighting. DOE-based projector designs are described, for example, in U.S. Patent Application Publication 2009/0185274, whose disclosure is incorporated herein by reference.

The "efficiency" of a DOE is a measure of the amount of input energy that the DOE diffracts, in relation to the energy of the incoming beam. This efficiency can vary in production due to manufacturing tolerances. It can also change during the lifetime and operation of the DOE for various reasons. For example, humidity and other vapors can condense on the DOE surface and lower its efficiency, or excess heat, due to a malfunction or misuse, can deform the DOE and change its efficiency. Such changes in efficiency can result in undesirable increases in the intensity of the zero diffraction order, which is not diffracted by the projection optics and may thus continue straight through the DOE to the projection volume.

U.S. Pat. No. 8,492,696, whose disclosure is incorporated herein by reference, describes a DOE-based projector with a built-in beam monitor, in the form of an integral optical detector. The detector signal can be continuously or intermittently monitored by a controller in order to evaluate the DOE efficiency and inhibit operation of the projector if the signal is outside a certain safe range.

SUMMARY

Embodiments of the present invention that are described hereinbelow provide methods and devices for monitoring the performance of a DOE.

There is therefore provided, in accordance with an embodiment of the invention, optical apparatus, including a primary radiation source, which is configured to emit first optical radiation along a first optical axis. A diffractive optical element (DOE) includes multiple optical surfaces, including at least an entrance surface, upon which the first optical radiation from the primary radiation source is incident, and an exit surface, through which one or more primary diffraction orders of the first optical radiation are emitted from the DOE toward a scene following diffraction by the DOE. At least one secondary radiation source is configured to direct second optical radiation to impinge on the DOE along a second optical axis, which is non-parallel to the first optical axis, causing at least a part of the second optical radiation to be diffracted by the DOE such that one or more secondary diffraction orders of the second optical radiation are emitted through the entrance face of the DOE. At least one detector is configured to sense at least one of the secondary diffraction orders of the second optical radiation.

In some embodiments, the apparatus includes a controller, which is configured to receive a signal output by the at least one detector in response to the at least one of the secondary diffraction orders, and to regulate an operation of the primary radiation source responsively to the signal. Typically, the controller is configured to inhibit the operation of the primary radiation source when the signal is outside a predefined range.

Additionally or alternatively, the apparatus includes at least one reference detector, positioned to receive a portion of the second optical radiation from the secondary radiation source that has not been diffracted by the DOE, and to output a reference signal to the controller responsively to the received portion. Typically, the controller is coupled to regulate the at least one radiation source responsively to the reference signal.

In some embodiments, the second optical radiation is directed into the DOE through a sidewall of the DOE, wherein the sidewall is not parallel to the optical surfaces. In a disclosed embodiment, the sidewall is at a non-normal angle with respect to the optical surfaces. Additionally or alternatively, the DOE includes a transmission diffraction grating incorporated into the sidewall.

In another embodiment, the at least one secondary radiation source includes a plurality of secondary radiation sources in different, respective locations, and the at least one detector is configured to sense the secondary diffraction orders of the secondary radiation emitted by each of the plurality of secondary radiation sources. Typically, each secondary radiation source emits optical radiation with a different, respective spectral and angular distribution.

In a disclosed embodiment, actuation of the at least one secondary radiation source is time-multiplexed with respect to the primary radiation source.

Additionally or alternatively, the primary radiation source and the at least one secondary radiation source are configured to emit the first and second optical radiation, respectively, at different, respective wavelengths.

In a disclosed embodiment, the apparatus includes a lens that directs the first optical radiation toward the DOE and focuses the at least one of the secondary diffraction orders onto the at least one detector.

There is also provided, in accordance with an embodiment of the invention, an optical method, which includes directing first optical radiation emitted from a primary radiation source along a first optical axis to impinge on an entrance surface of a diffractive optical element (DOE), whereby the DOE diffracts the first optical radiation to form one or more primary diffraction orders, which are emitted toward a scene through an exit surface of the DOE. Second optical radiation is directed to impinge on the DOE along a second optical axis, which is non-parallel to the first optical axis, causing at least a part of the second optical radiation to be diffracted by the DOE as secondary diffraction orders such that one or more of the secondary diffraction orders of the second optical radiation are emitted through the entrance face of the DOE. At least one of the secondary diffraction orders of the second optical radiation that has been emitted though the entrance face is received and sensed.

The present invention will be more fully understood from the following detailed description of the embodiments thereof, taken together with the drawings in which:

DETAILED DESCRIPTION OF EMBODIMENTS

Figure 1:
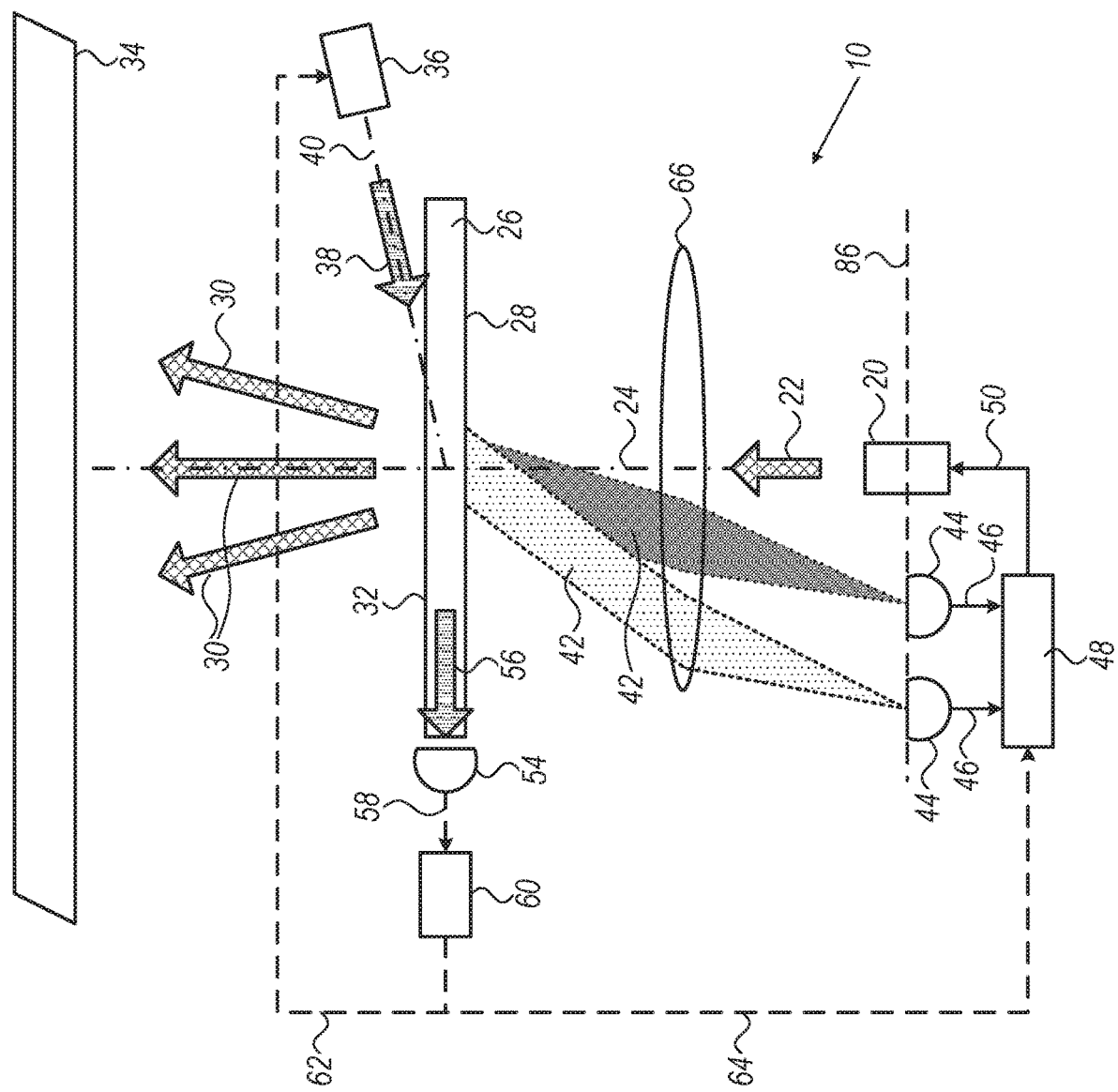
FIG. 1 is a schematic side view of an optical projector with a beam monitor, in accordance with an embodiment of the present invention.

Optical projectors based on diffractive optical elements (DOEs) sometimes suffer from the "zero-order problem," which is described in the above-mentioned US 2009/0185274: A portion of the input beam of the projector (the zero diffraction order) may not be diffracted by the projection optics and may thus continue through to the projection volume. Changes in efficiency of a DOE, with concomitant increases in the zero-order intensity, can compromise system performance.

In embodiments of the present invention that are described herein, optical radiation from a primary source passes through a DOE, which diffracts the radiation, for example to project patterned radiation toward a scene. The DOE is also probed by at least one secondary radiation source to generate secondary diffraction orders, whose intensities are indicative of the integrity and performance of the DOE. This information can then be used for controlling the primary radiation source. The secondary diffraction orders propagate in a reverse direction as compared to the primary radiation source, and hence do not interfere with the intended operation of the projector. Moreover, since the secondary radiation source is independent of the primary radiation source, the design constraints for utilizing the secondary radiation are relaxed.

In the disclosed embodiments, the secondary radiation source illuminates the DOE so that at least one secondary diffraction order from the DOE exits through the entrance face of the DOE. This secondary diffraction is detected by one or more radiation detectors, positioned so that each detector senses a small and separate subset of the secondary diffraction orders. Detection of separate secondary diffraction orders allows for comparison between the intensities in the separate orders, thus increasing the information about the integrity and performance of the DOE. The signals from these radiation detectors are connected to a controller, which controls the primary radiation source. If the signal from the radiation detectors is outside a predetermined range, the primary controller takes corrective action, for example by turning the primary radiation source off.

In some embodiments, the optical radiation from the secondary source is directed through the sidewall of the DOE. It can be advantageous in these embodiments that the sidewall be tilted to a non-normal angle with respect to the entrance or exit surfaces of the DOE in order to achieve desired angles of incidence of the optical radiation from the secondary radiation source onto the diffractive structures of the DOE. Further modification of the angles of incidence of the optical radiation onto the diffractive structures of the DOE, as well as addition of angular components to this optical radiation, can be achieved by incorporating a transmission diffraction grating onto the sidewall.

Further embodiments use two or more secondary radiation sources to direct radiation into the DOE, with each source having its own angular and spectral radiation distribution.

In some embodiments, in addition to the detectors that detect the secondary diffraction orders, one or more reference detectors of optical radiation are positioned to receive non-diffracted optical radiation from the secondary radiation source. The signals from the reference detectors are used in generating a secondary control signal that is used as feedback control of the secondary radiation sources for stabilizing their output intensity. Furthermore, the output of the reference detectors can be used to provide information about the intensities of the secondary radiation sources to the controller in order to enhance the immunity of the control loop to fluctuations of the intensities of the secondary radiation source.

In some embodiments, a collimator lens is positioned between the primary radiation source and the DOE for the purpose of collimating the optical radiation from the primary radiation source. This same lens can be used in focusing the secondary diffraction orders of the optical radiation from the secondary radiation sources onto the detectors. Positioning the first radiation detectors in the focal plane of the collimator lens causes each detector to receive a small subset of the secondary diffraction orders.

FIG. 1 is a schematic side view of optical apparatus 10, comprising an optical projector with a beam monitor, in accordance with an embodiment of the present invention. A primary radiation source 20 emits first optical radiation along a first optical axis 24. (The terms "optical radiation" and "light," as used in the present description and in the claims, mean any or all of visible, infrared, and ultraviolet radiation.) The first optical radiation enters a DOE 26 through its entrance surface 28, diffracting onto primary diffraction orders 30, which exit the DOE through an exit face 32 towards a scene 34. DOE 26 may configured in this manner, for example, to project a pattern of radiation onto the scene.

To monitor the integrity of DOE 26, and thus of the projector, a secondary radiation source 36 emits second optical radiation 38 along a second optical axis 40, which is non-parallel to first optical axis 24. Second optical radiation 38 enters DOE 26, which diffracts a portion of it into secondary diffraction orders 42. Although only a single secondary radiation source 36 is shown in FIG. 1, with axis 40 angled relative to entrance and exit faces 28 and 30 of the DOE, in other embodiments, as shown in the figures that follow, axis 40 may intercept a sidewall of the DOE, and/or multiple secondary radiation sources may be used. Furthermore, although in FIG. 1 the radiation emitted by secondary radiation source 36 is shown as a single angular mode 38, in other embodiments, as shown in the figures that follow, the second optical radiation 38 may comprise a plurality of discrete angular modes or a continuum of angular modes.

In an embodiment, secondary radiation source 36 comprises an LED (light-emitting diode). In an alternative embodiment, secondary light source 36 comprises a VCSEL (vertical-cavity surface-emitting laser), possibly combined with a diffuser. In a further embodiment, a combination of LEDs and VCSELs are used as secondary radiation sources.

Secondary diffraction orders 42 are focused by collimating lens 66 onto one or more detectors 44. Although two detectors 44 are shown in FIG. 1, alternative embodiments may use a single detector or three or more detectors, depending upon application requirements. Signal outputs 46 from detectors 44 are fed to a controller 48, which generates a control signal 50 to turn off primary radiation source 20, when outputs 46 are outside a predetermined range. Typically, detectors 44 comprise photodiodes. Alternatively, assuming primary radiation source 20 to be a semiconductor optoelectronic device, such as a VCSEL, the primary radiation source itself may function (when optical radiation 22 is switched off) as a detector of secondary diffraction orders 42.

Further in FIG. 1, a reference detector 54 is positioned so that it receives a portion of optical radiation 56 from secondary radiation source 36, which portion has not been diffracted by DOE 26. A signal output from reference detector 54 is fed to a secondary controller 60, which generates two control signals 62 and 64. Alternatively, the functions of secondary controller 60 may be integrated with controller 48. Control signal 62 is connected to secondary radiation source 36 for stabilizing the intensity of optical radiation 38 emitted by the secondary radiation source. Control signal 64 is connected to primary controller 48 as a reference to enhance the immunity of control signal 50 to fluctuations of the intensity of optical radiation 38 from secondary radiation source 36.

In an embodiment, controller 48 computes a Figure-of-Merit for the integrity of DOE 26 by dividing each signal output 46 by signal output 58. As diffraction orders 42 are proportional to the intensity of secondary radiation source 36, signal outputs 46 are also proportional to this intensity. As further signal output 58 is proportional to the intensity of secondary radiation source 36, dividing each signal output 46 by signal output 58 cancels out the effects of fluctuations in the intensity of secondary radiation source 36 on the Figure-of-Merit. Additionally or alternatively, the Figure-of-Merit can be based on a ratio of the respective signal outputs 46 from detectors 44. The principles of this embodiment can be extended to several secondary radiation sources in a straightforward way. In any case, controller 48 is typically programmed with a range of acceptable values of the Figure-of-Merit and will switch off primary radiation source 20 when the calculated value of the Figure-of-Merit is outside this range.

In an embodiment, the secondary source 36 and primary source 20 are time-multiplexed, i.e. actuated to emit radiation at separate times. This enables an integrity check of DOE 26, using secondary source 36, before turning on primary source 20. Furthermore, secondary source 36 may be turned on at intervals when primary source 20 is turned off for further integrity checks of DOE 26.

In a further embodiment, secondary source 36 may operate at a wavelength different from that of primary source 20. Detectors 44 and 54 are configured, by using suitable optical filters or by the material properties of these detectors or by any other suitable method, to detect only radiation at the wavelength of secondary source 36. As the angle of separation between diffraction orders 42, as well as their separation from first optical axis 24, is a function of the wavelength of secondary source 36, with longer wavelength leading to larger angles of separation, the choice of wavelength of the secondary source allows a degree of flexibility in the physical placement of detectors 44. Furthermore, having secondary source 36 operate at a wavelength different from that of primary source 20 allows secondary source 36 and primary source 20 to operate simultaneously, without the radiation from primary source 20 interfering with the signals detected by detectors 44 and 54.

Figure 2:
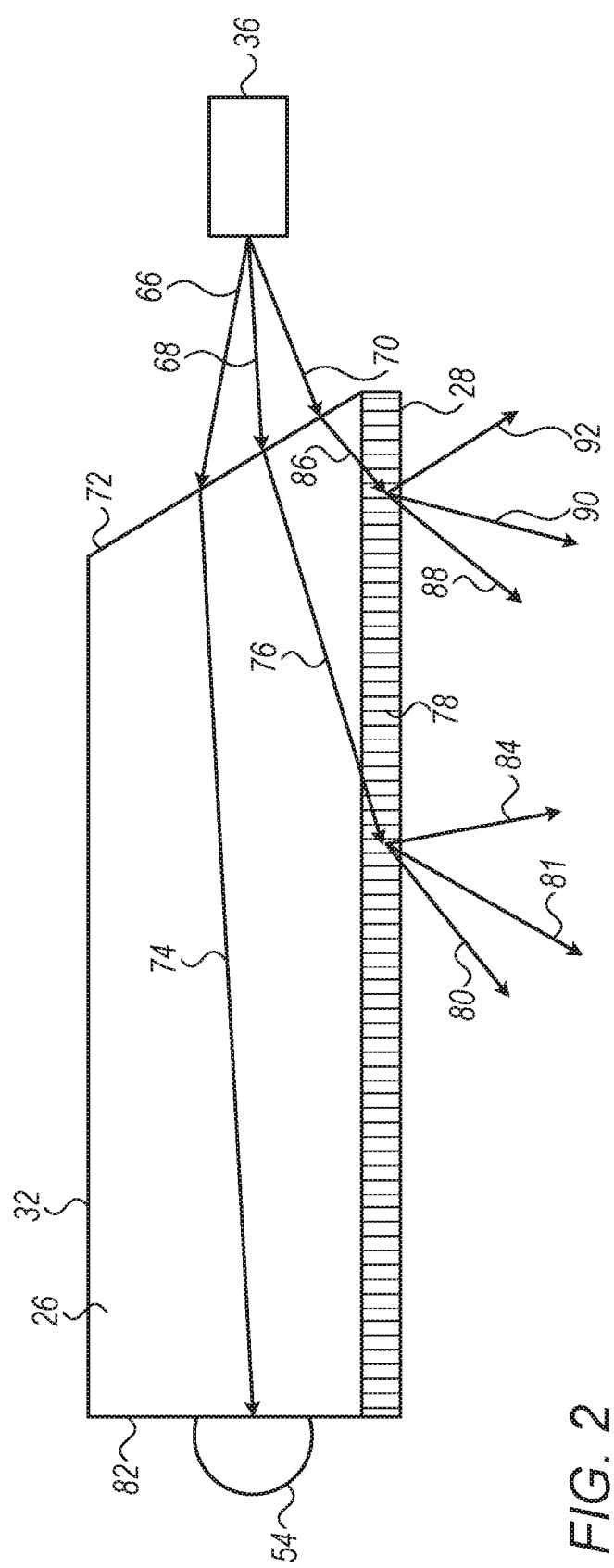
FIG. 2 is a schematic side view of a DOE irradiated by a radiation source emitting an angular spread of radiation, in accordance with an embodiment of the invention.

FIG. 2 is a schematic side view of DOE 26 irradiated by secondary radiation source 36, in accordance with an embodiment of the invention. The radiation from the secondary radiation source comprises a broad continuum of angular modes, including radiation modes 66, 68, and 70. The arrows corresponding to modes 66, 68, and 70 indicate the directions of three angular modes within the broad continuum. In the embodiment of FIG. 2, radiation modes 66, 68, and 70 enter DOE 26 through a sidewall 72, which is tilted to a non-normal angle with respect to entrance and exit faces 28 and 32. In an embodiment a transmission grating is incorporated in sidewall 72 in order to select the angles of propagation of modes 66, 68 and 70 in DOE 26.

Radiation mode 66 impinges onto sidewall 72, and enters into DOE 26, becoming a radiation mode 74, wherein the change of the direction from mode 66 to mode 74 is determined by the optical refraction at sidewall 72, as well as by a transmission diffraction grating, if it is incorporated in sidewall 72. Mode 74 propagates within DOE 26, without impinging on a diffractive structure 78 located on or adjacent to entrance surface 28. Mode 74 further propagates to a sidewall 82 of DOE 26, exiting through this sidewall. Adjacent to sidewall 82 is located reference detector 54, as described in the context of FIG. 1, which receives and senses mode 74.

Another mode 68, emitted by radiation source 36, enters into DOE 26 through sidewall 72, and becomes a radiation mode 76. The change of direction from mode 68 to mode 76 is governed by the same factors as the change of direction from mode 66 to mode 74. As opposed to mode 74, however, mode 76 does impinge on diffractive structure 78, and is diffracted into a zero-order diffraction 80, a first order diffraction 81, and a second order diffraction 84. These diffraction orders exit from DOE 26 after further refraction at surface 28. Similarly to mode 68, mode 70 emitted by radiation source 36 becomes a mode 86 inside DOE 26, and is further diffracted into orders 88, 90, and 92.

Figure 3:
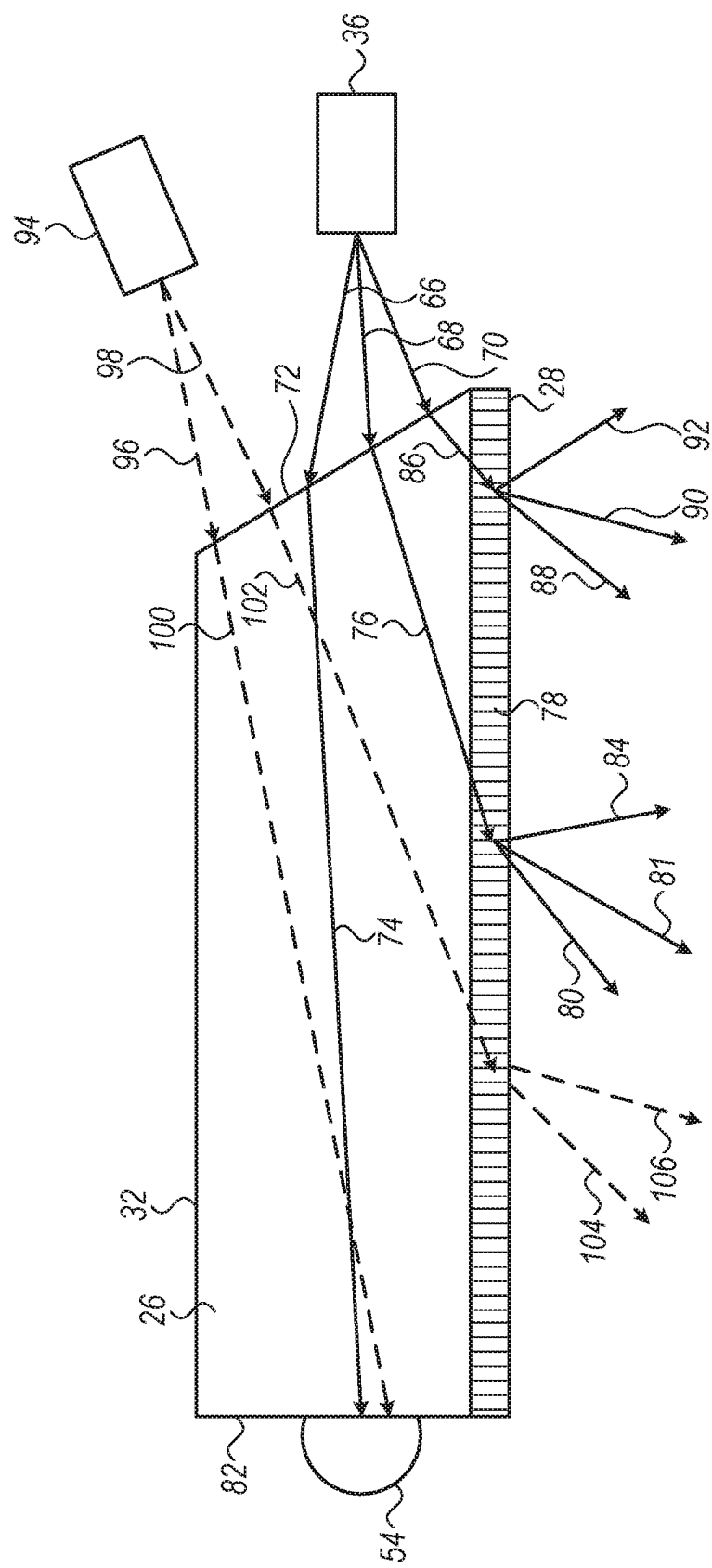
FIG. 3 is a schematic side view of a DOE irradiated by two radiation sources emitting an angular spread of radiation, in accordance with the embodiment of the invention.

FIG. 3 is a schematic side view of DOE 26 irradiated by two secondary radiation sources 36 and 94, in accordance with an embodiment of the invention. The radiation characteristics and modes of secondary radiation source 36 are similar to those shown in FIG. 2. Secondary radiation source 94 also emits radiation over a broad angular extent.

In similar fashion to the description in FIG. 2 for radiation source 36 and its modes, the broad angular extent of radiation source 94 is described by discrete modes 96 and 98. These modes enter DOE 26 through its sidewall 72, becoming modes 100 and 102, respectively. Mode 100 propagates, without impinging on diffractive structure 78, to sidewall 82, where it is received by reference detector 54. Mode 102 propagates to diffracting structure 78, where it is diffracted into a zero-order 104 and a first order 106.

The use of two secondary radiation sources 36 and 94, which may have different angular orientations and/or different angular extents of the emitted radiation, as well as different emission spectra, adds further information into the diffracted orders probing DOE 26 beyond that available from a single secondary radiation source. The number of secondary radiation sources can in a straightforward way be extended to more than two sources.

In an embodiment, secondary sources 36 and 94 may operate at a wavelength different from that of primary source 20, with suitably matched detectors, as described for FIG. 1.

In a further embodiment, secondary sources 36 and 94 may operate at different wavelengths from each other. Detectors 44 and 54 are configured either to have each detector detect the wavelengths emitted by both secondary sources 36 and 94, or alternatingly, by having multiple detectors 44 and 54, with separate detectors 44 and 54 detecting the radiation emitted by each of secondary sources 36 and 94. Employing a different wavelength for secondary source 94 from that of secondary source 36 enables a further flexibility for the choice of diffraction angles for diffraction orders 104 and 106, and consequently for the placement of detectors 44 detecting diffraction orders 104 and 106. Furthermore, having separate detectors 44 detecting either the radiation from secondary source 36 or from secondary source 94 enables further discrimination between the diffraction orders generated by the two secondary sources.

The method of time-multiplexing, explained in the context of FIG. 1, may be extended to the embodiment of two or more secondary sources.

Figure 4:
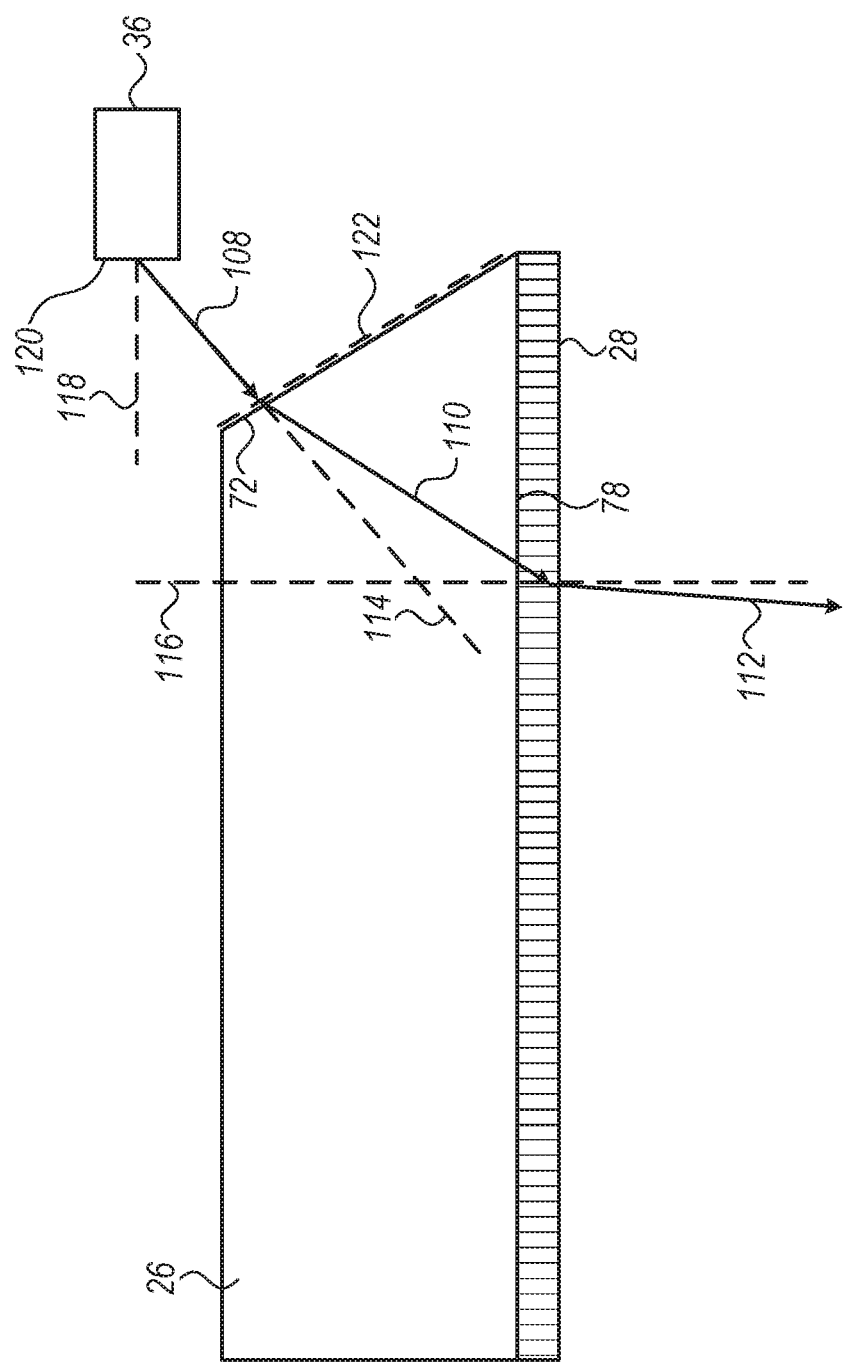
FIG. 4 is a schematic representation of the propagation of one mode from a secondary radiation source to a diffraction order of a DOE, in accordance with an embodiment of the invention.

FIG. 4 is a schematic representation of the propagation of a mode 108 from secondary radiation source 36 to a diffraction order 112 of DOE 26, in accordance with an embodiment of the invention. Mode 108 impinges on sidewall 72 of DOE 26 and is deviated from its original direction into a mode 110. The angle of sidewall 72 with respect to entrance face 28, the refractive index of DOE 26, and a transmission grating 122 incorporated in sidewall 72, are chosen to yield an angle of deviation of 17° between mode 110 and an original direction 114 of mode 108. The geometry is further chosen so that the angle of incidence on diffractive structure 28 of DOE 26 is 22°, where angle of incidence is defined as the angle between mode 110 and a normal 116 to entrance face 28.

Assuming diffractive structure 78 to have a pitch of 5 μm of, diffraction order 112 exits DOE 26 at an angle of approximately 1.1° with respect to normal 116. The angle between mode 108 and normal 118 to entrance face 120 of secondary radiation source 36 is thus calculated to be 90°−(22°+17°)=51°, wherein 22° is the above-mentioned angle of incidence, and 17° is the above-mentioned angle of deviation. One of detectors 44 (FIG. 1) is positioned to receive this order 112, which is focused onto the detector by lens 66.

The above angular calculation can be used in determining the intensity of radiation from secondary radiation source 36 feeding into the modes under consideration. Electromagnetic calculations performed on diffractive structure 28, with pitch of 5 μm, height 1.5 μm, and etched in glass with refractive index 1.5, result in 15% diffraction efficiency from mode 110 to mode 112, where mode 112 power has been integrated from 1.0° to 1.2°. The signal-to-noise ratio for detecting the secondary diffraction in mode 112 may be calculated by using the following parameters of the system: The secondary radiation source is an LED, with wavelength of 850 nm, current of 20 mA, efficiency 4%, bandwidth 10 nm, aperture diameter 81 μm, and FWHM (full-width half-maximum) radiation beam spread of 100°. Radiation detector 44 (FIG. 1) is a photodiode, with aperture 100 μm×100 μm, quantum efficiency 10%, integration node capacitance 10 pF, exposure time 10 ms, a distance from photodiode to LED of 5.5 mm, LED-to-photodiode gain of 1% due to the spreading diffraction orders.

Using the above parameters, the calculated signal-to-noise ratio of signal output 46 from detector 44 is 69 dB. This high signal-to-noise ratio means that signal output 46 will provide a sensitive indication of any changes in the condition and performance of diffractive structure 78, particularly when combined with signal output 58 (FIG. 1) as a reference.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
   a primary radiation source, which is configured to emit first optical radiation along a first optical axis;
   a diffractive optical element (DOE), which comprises multiple optical surfaces, comprising at least an entrance surface, upon which the first optical radiation from the primary radiation source is incident, and an exit surface, through which one or more primary diffraction orders of the first optical radiation are emitted from the DOE toward a scene following diffraction by the DOE;
   at least one secondary radiation source, comprising at least one emitter selected from a group of emitters consisting of a light-emitting diode and a laser, which is configured to direct second optical radiation to impinge on the DOE along a second optical axis, which is non-parallel to the first optical axis, causing at least a part of the second optical radiation to be diffracted by the DOE such that one or more secondary diffraction orders of the second optical radiation are emitted through the entrance surface of the DOE;
   at least one detector, which is configured to sense at least one of the secondary diffraction orders of the second optical radiation; and
   at least one reference detector, positioned to receive a portion of the second optical radiation from the secondary radiation source that has not been diffracted by the DOE.

2. The apparatus according to claim 1, and comprising a controller, which is configured to receive a signal output by the at least one detector in response to the at least one of the secondary diffraction orders and a reference signal output by the at least one reference detector, and to regulate an operation of the primary radiation source responsively to the signal and the reference signal.

3. The apparatus according to claim 2, wherein the controller is configured to inhibit the operation of the primary radiation source when the signal is outside a predefined range.

4. The apparatus according to claim 1, wherein the second optical radiation is directed into the DOE through a sidewall of the DOE, wherein the sidewall is not parallel to the optical surfaces.

5. The apparatus according to claim 4, wherein the sidewall is at a non-normal angle with respect to the optical surfaces.

6. The apparatus according to claim 4, wherein the DOE comprises a transmission diffraction grating incorporated into the sidewall.

7. The apparatus according to claim 1, wherein the at least one secondary radiation source comprises a plurality of secondary radiation sources in different, respective locations, and the at least one detector is configured to sense the secondary diffraction orders of the secondary radiation emitted by each of the plurality of secondary radiation sources.

8. The apparatus according to claim 7, wherein each secondary radiation source emits optical radiation with a different, respective spectral and angular distribution.

9. The apparatus according to claim 1, wherein actuation of the at least one secondary radiation source is time-multiplexed with respect to the primary radiation source.

10. The apparatus according to claim 1, wherein the primary radiation source and the at least one secondary radiation source are configured to emit the first and second optical radiation, respectively, at different, respective wavelengths.

11. The apparatus according to claim 1, and comprising a lens that directs the first optical radiation toward the DOE and focuses the at least one of the secondary diffraction orders onto the at least one detector.

12. An optical method, comprising:

directing first optical radiation emitted from a primary radiation source along a first optical axis to impinge on an entrance surface of a diffractive optical element (DOE), whereby the DOE diffracts the first optical radiation to form one or more primary diffraction orders, which are emitted toward a scene through an exit surface of the DOE;

directing second optical radiation emitted from a secondary radiation source comprising at least one emitter, selected from a group of emitters consisting of a light-emitting diode and a laser, to impinge on the DOE along a second optical axis, which is non-parallel to the first optical axis, causing at least a part of the second optical radiation to be diffracted by the DOE as secondary diffraction orders such that one or more of the secondary diffraction orders of the second optical radiation are emitted through the entrance surface of the DOE;

receiving and sensing at least one of the secondary diffraction orders of the second optical radiation that has been emitted though the entrance face; and receiving and sensing a portion of the second optical radiation that has not been diffracted by the DOE so as to generate a reference signal.

13. The method according to claim 12, wherein sensing the at least one of the secondary diffraction orders comprises monitoring a performance of the DOE responsively to an intensity of the at least one of the secondary diffraction orders and to the reference signal.

14. The method according to claim 13, and comprising controlling an operation of the primary radiation source responsively to the monitored performance.

15. The method according to claim 14, wherein controlling the operation comprises inhibiting the operation of the primary radiation source when the intensity is outside a predefined range.

16. The method according to claim 13, wherein the primary diffraction orders that exit the DOE via the exit surface include a zero order, and wherein monitoring the performance comprises detecting a potential increase in the zero order responsively to a change in the intensity of the at least one of the secondary diffraction orders.

17. The method according to claim 12, wherein directing the second optical radiation comprises directing the second optical radiation into the DOE through a sidewall of the DOE, wherein the sidewall is not parallel to the entrance and exit surfaces.

* * * * *